Figure 1:
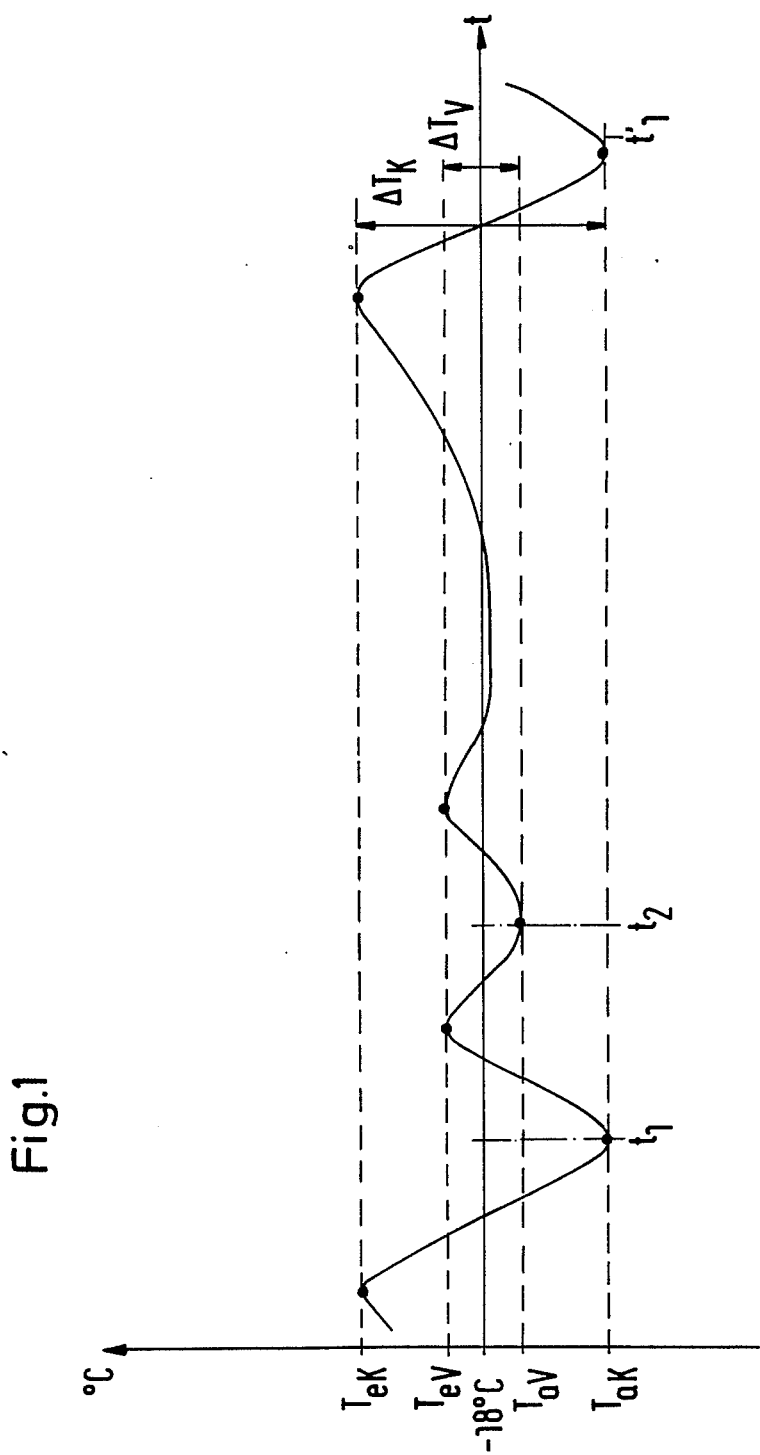

United States Patent [19]
Meyer

[11] Patent Number: 4,949,548
[45] Date of Patent: Aug. 21, 1990

[54] PROCESS FOR CONTROLLING THE OPERATION OF A REFRIGERATING UNIT

[76] Inventor: Friedhelm Meyer, Hof Geisenberg, D-5920 Bad Berleburg 11, Fed. Rep. of Germany

[21] Appl. No.: 309,643

[22] Filed: Feb. 10, 1989

[30] Foreign Application Priority Data

Feb. 11, 1988 [DE] Fed. Rep. of Germany ....... 3804246

[51] Int. Cl.$^5$ ............................................. F25D 17/02
[52] U.S. Cl. .......................................... 62/98; 62/180; 62/229
[58] Field of Search ...................... 62/180, 229; 236/11

[56] References Cited

U.S. PATENT DOCUMENTS 4,467,617  8/1984  Morgan, Jr. et al. ................. 62/180
4,485,633  12/1984  King et al. ............................. 62/180

OTHER PUBLICATIONS

Considine, Process Instruments & Controls 1957, P11-17 & 11-18, TA 165,C65.

Primary Examiner—William E. Wayner
Attorney, Agent, or Firm—Austin R. Miller

[57] ABSTRACT

With a process for controlling the operating of a refrigerating unit with an evaporator and a fan, the fan being cut in and cut out independently of the refrigerating unit, which is cut in at a predetermined cut-in temperature, above a set value, and is cut out at a predetermined cut-out temperature, below the set value, to save energy for the refrigerating operation, whenever there is a cutting-out operation of the refrigerating unit, the fan likewise cuts out and then cuts in again as soon as a predetermined cut-in temperature of the fan, lying below the cut-in temperature of the refrigerating unit, is reached.

2 Claims, 2 Drawing Sheets

PROCESS FOR CONTROLLING THE OPERATION OF A REFRIGERATING UNIT

The invention relates to a process for controlling the operation of a refrigerating unit with an evaporator and a fan, the fan being cut in and cut out independently of the refrigerating unit, which is cut in at a predetermined cut-in temperature, lying above a set value, and is cut out at a predetermined cut-out temperature, lying below the set value.

It is known, in the case of a refrigerating unit which is to keep a refrigerating room at a predetermined regrigerating temperature, to cut in and cut out the fan, usually provided on the evaporator, independently of the refrigerating unit, the fan being cut in and cut out at predetermined temperatures which lie outside the temperature difference between cut-in temperature and cut-out temperature of the refrigerating unit.

The invention is based on the object of designing a process of the type specified at the beginning such that a saving in energy expenditure for the refrigerating operation is achieved.

This object is achieved by the features in the characterizing part of claim 1. As a result of the fact that, after cutting-out of the refrigerating unit and of the fan, the latter is cut in again before the cut-in temperature of the refrigerating unit is reached, the residual coldness still existing in the evaporator, for example of an ice formation existing in the evaporator, can be blown into the refrigerating room, so that a renewed cutting-in of the refrigerating unit is postponed and consequently an energy saving is achieved.

Advantageous developments of the invention are specified in the following description and in claim 2.

Figure 2:
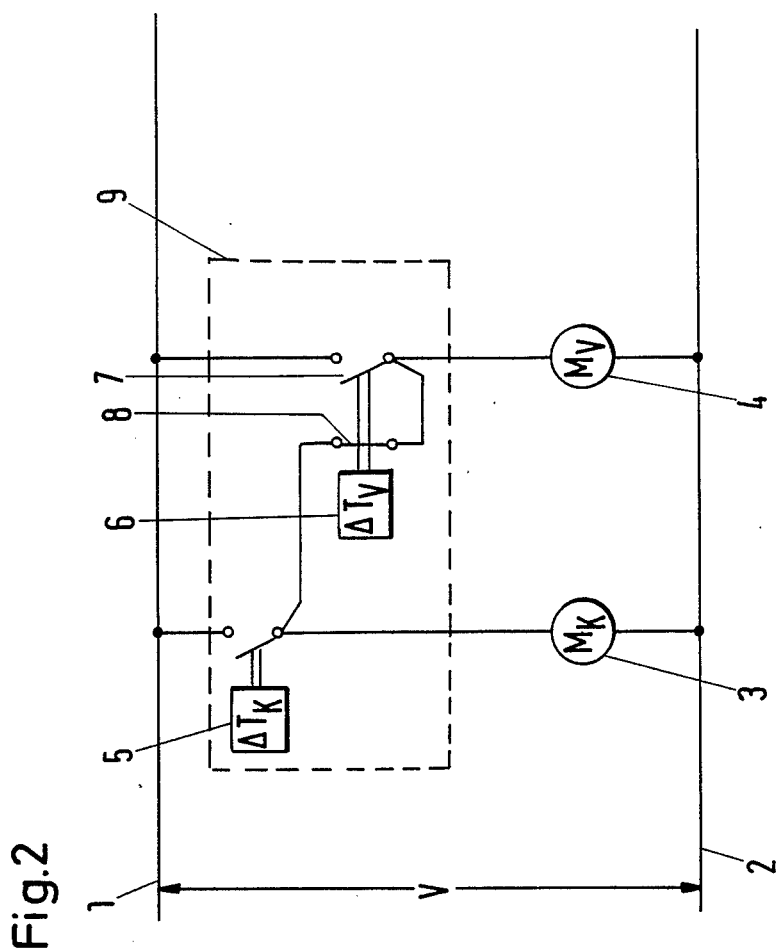

An exemplary embodiment of the invention is explained in more detail below with reference to the drawing, in which, FIG. 1 shows, in a diagram, the temperature profile between cut-in temperatures and cut-out temperatures of refrigerating unit and fan over time and FIG. 2 shows a circuit diagram of a device for implementing the process.

In a refrigerating room, for example a refrigerating temperature of $-18°$ C. is preselected, which is to be maintained by the refrigerating unit. Around this set value of $-18°$ C., a temperature difference $\Delta T_K$ between a cut-in temperature $T_{eK}$ and a cut-out temperature $T_{aK}$ is preselected. In this case, the cut-in temperature $T_{eK}$ may, for example, lie above the set value by $2°$ C. and the cut-out temperature $T_{aK}$ may lie below the set value likewise by $2°$ C. Depending on the load on the refrigerating unit, or on the refrigerating goods present in the refrigerating room, the cut-in temperature and cut-out temperature of the refrigerating unit is reached more or less frequently, which is established by a temperature sensor arranged in the refrigerating room.

Each time the refrigerating unit is cut out because the temperature in the refrigerating room has reached the cut-out temperature $T_{aK}$, the fan is also cut out, if it was cut in up to this point in time, or it remains cut out if the fan happens not to have been cut in previously. The cutting out takes place at the time $T_1$.

Thereafter, the temperature in the refrigerating room rises again above the set value. Before the cut-in temperature $T_{eK}$ of the refrigerating unit is reached, a cut-in temperature $T_{eV}$ for the fan is preselected, which lies, for example, $0.5°$ C. above the set value, so that, upon reaching this cut-in temperature $T_{eV}$, the fan is cut in independently of the refrigerating unit. Since there is a certain residual coldness in the evaporator, this is blown into the refrigerating room by the fan. In particular if ice has formed in the evaporator, but a defrosting operation has not yet been initiated, air is blown by the fan over the ice and thereby cooled. As a result, the temperature in the refrigerating room may drop again, so that the reaching of the cut-in temperature TeK of the refrigerating unit is postponed.

The fan may remain cut in until the cut-in temperature $T_{eK}$ of the refrigerating unit is reached, and subsequently its cut-out temperature $T_{aK}$.

In the case of the exemplary embodiment according to the diagram, a cut-out temperature $T_{aV}$ for the fan is preselected at, for example, $0.5°$ C. below the set value, so that the fan is cut out again as soon as this temperature of $-18.5°$ C. is reached. This takes place at the time $t_2$.

Once the fan has also cut out, the temperature in the refrigerating room rises again, the cut-in temperature $T_{eV}$ for the fan being reached again after a certain time and the said fan cut in. If, for example, there is no longer much residual coldness in the evaporator, and in particular also no appreciable ice formation any longer, although the temperature in the refrigerating room can be lowered a little more by the fan, nevertheless, for example the cut-out temperature $T_{aV}$ is no longer reached, so that the fan continues to run. After a certain time, the temperature in the refrigerating room rises again, until the cut-in temperature $T_{eK}$ of the refrigerating unit is reached and the said unit cut in. Thereafter, the temperature in the refrigerating room is lowered, until the cut-out temperature $T_{aK}$ is again reached and the refrigerating unit is cut out with the fan. At this time $t'_1$, the operation described recommences.

The control described is performed by an electronic control system, which is provided with a timer and is connected to a temperature sensor, which emits electric signals corresponding to the temperature determined.

It is obvious that, by the operation of the fan within the temperature difference $\Delta T_K$ between cut-in temperature and cut-out temperature $T_{eK}$ and $T_{aK}$, respectively, of the refrigerating unit, a postponement of the renewed cutting-in of the refrigerating unit is achieved, and consequently a saving in energy. In particular, by operating the fan with a smaller temperature difference $\Delta T_V$ between cut-in temperature and cut-out temperature $T_{eV}$ and $T_{aV}$, respectively, within the greater temperature difference $\Delta T_K$ of the refrigerating unit, a defrosting of ice on the evaporator can be achieved without cutting-in of the defrosting heater, because ice forming is defrosted again by the air blown by the fan through the evaporator. This applies to temperatures which lie in the region of $0°$ C. As a result, a further energy saving is obtained by less frequent cutting-in of the defrosting heater.

In the case of the exemplary embodiment described, a temperature difference $\Delta T_K$ between cut-in temperature and cut-out temperature of the refrigerating unit around the set value to be maintained is preselected. It is, however, also possible to arrange this temperature difference, for example, above the set value, so that the cut-out temperature of the refrigerating plant coincides with the set value. In such a case as well, the smaller temperature difference $\Delta T_V$ for the fan may be provided within the greater temperature difference $\Delta T_K$ between cut-in temperature and cut-out temperature of the refrigerating plant.

FIG. 2 shows a circuit diagram of a device for implementation of the process described, 1 and 2 denoting lines, between which a voltage V is applied. 3 denotes the motor of the refrigerating plant and 4 denotes the motor of the fan. In the supply line of the motor 3, there is arranged a thermostat 5, which is set to the temperature difference $\Delta T_K$ and the refrigerating plant is cut in upon reaching the cut-in temperature $T_{eK}$ and is cut out upon reaching the cut-out temperature $T_{aK}$, the cut-out position being reproduced in FIG. 2. A further thermostat 6, with a first switching contact 7 and a second switching contact 8, lies with the switching contact 7 in the supply line of the motor 4 for the fan and with the switching contact 8 in a connecting line between the two supply lines of the two motors, the switching contact 8 being closed when the switching contact 7 is open and vice versa. This thermostat 6 is set to the temperature difference $\Delta T_V$, it assuming the switching position shown when the cut-out temperature $T_{aV}$ for the fan has been reached. In this switching state, the switching contact 8 is closed, so that the fan is cut in as soon as the refrigerating plant is cut in by the thermostate 5.

The two thermostats 5, 6 may be arranged in a common housing 9, as indicated by broken lines.

The device described according to FIG. 2 may be provided, for example, in a domestic refrigerator, in combination with a small drum-type fan in the region of the evaporator, in order to achieve, with little expenditure, an energy saving in the case of the defrosting heater provided in a domestic refrigerator. The device according to FIG. 2 may also be provided in the case of a usual refrigerating plant, but the control of refrigerating plant and fan in preferably integrated in an electronic switching unit, provided such a unit exists for controlling other operating states in a refrigerating plant.

I claim:

1. Process for controlling the operation of a refrigerating unit with an evaporator fan, whereiin the evaporator fan and unit are programmed to sense and be responsive to air temperatures cooled by the refrigeration unit and said fan is connected to cut in and cut out independently of the refrigeration unit, which refrigeration unit is programmed to be cut in at a predetermined cut-in temperature lying above a preset temperature, and is cut out at a predetermined cut-out temperature lying below said preset temperature, characterized in that, upon a cutting-out operation of the refrigeration unit, the fan is programed to be likewise cut out or to remain cut out and said fan is programmed to be cut in again as soon as a predetermined cut-in temperature of the fan, lying below the cut-in temperature of the refrigeration unit, is reached.

2. Process according to claim 1, characterized in that, within the temperature difference ($\Delta T_K$) between cut-in temperature and cut-out temperature ($T_{ek}$ and $T_{aK}$, respectively) of the refrigerating unit, a smaller temperature difference ($\Delta T_V$) between a cut-in temperature and a cut-out temperature ($T_{eV}$ and $T_{aV}$, respectively) of the fan is preselected.

* * * * *